United States Patent [19]
LeBlanc

[11] Patent Number: 5,217,336
[45] Date of Patent: Jun. 8, 1993

[54] EDGE FINDER

[76] Inventor: Eric A. LeBlanc, 104 Landry St., Donaldsonville, La. 70346

[21] Appl. No.: 807,223

[22] Filed: Dec. 16, 1991

[51] Int. Cl.⁵ .......................................... B23Q 17/22
[52] U.S. Cl. ...................................... 409/218; 33/642
[58] Field of Search .................... 408/16, 75, 116; 409/133, 218; 33/559, 626, 628, 630, 638, 640, 642

[56] References Cited

U.S. PATENT DOCUMENTS 3,785,058 1/1974 Egli ...................................... 33/642
3,999,299 12/1976 Johnson ................................ 33/642

FOREIGN PATENT DOCUMENTS 2648963 5/1978 Fed. Rep. of Germany ........ 33/626

Primary Examiner—Daniel W. Howell
Attorney, Agent, or Firm—Keaty & Keaty

[57] ABSTRACT

The invention relates to a tool for aligning a true axis of a milling machine spindle with an edge of the workpiece to allow exact positioning of the spindle above a center of a bore to be drilled. The edge finder has an elongated body which carries a measuring gauge and which is provided with a push pin which contacts the edge of the workpiece and pushes a pivotal arm of the gauge to indicate a location of the edge of the workpiece.

21 Claims, 1 Drawing Sheet

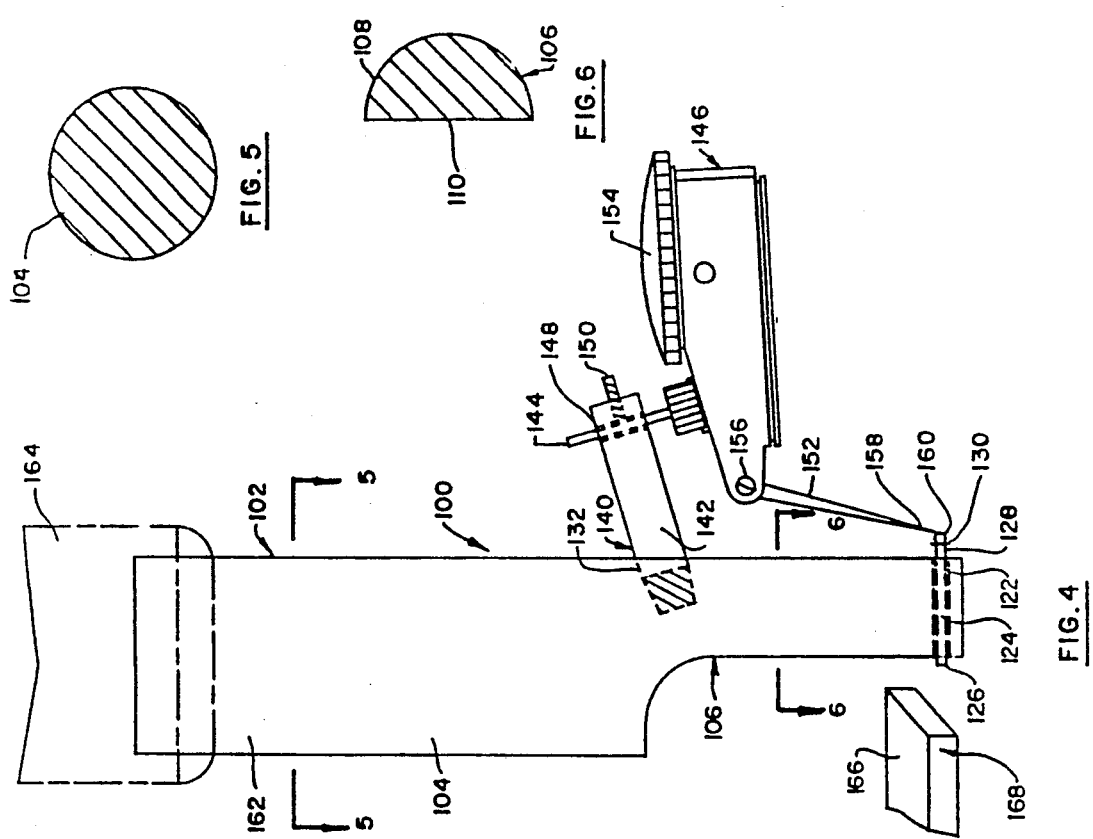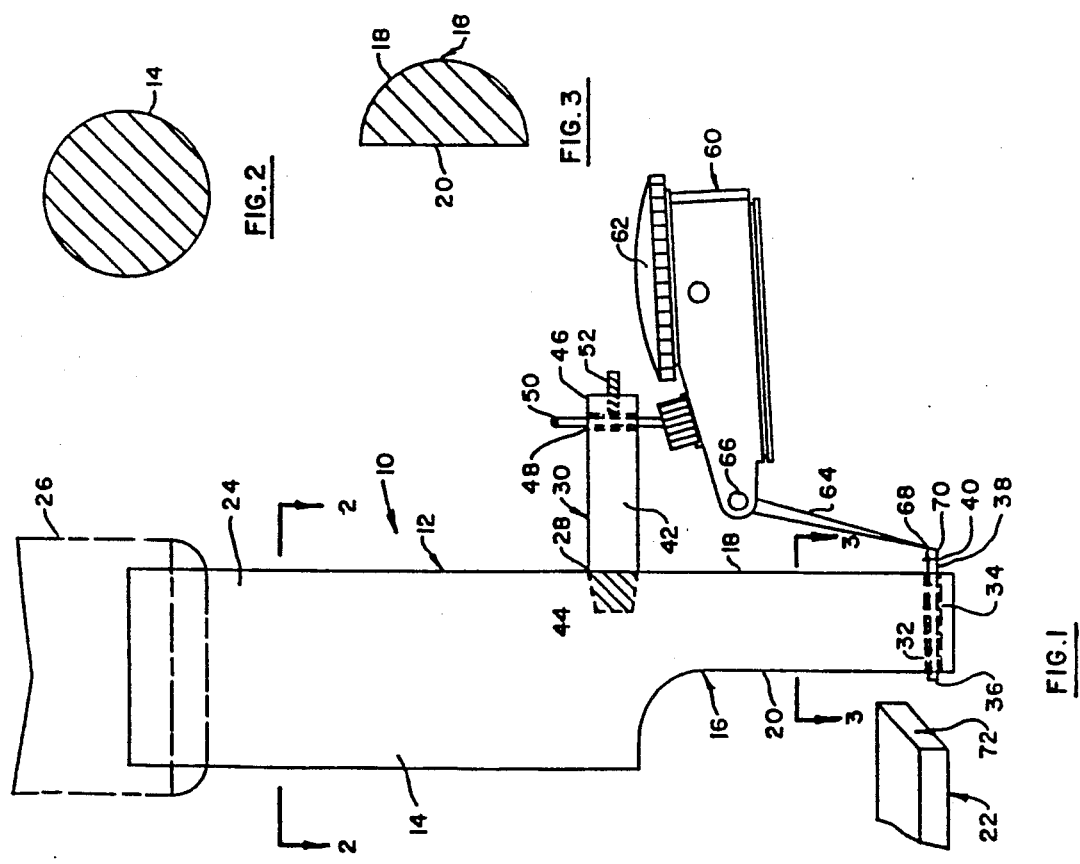

EDGE FINDER

BACKGROUND OF THE INVENTION

The present invention relates to a tool adapted for use in the milling process, and more specifically to a device for finding an edge of a workpiece and to establish a reference point.

In a milling process it is extremely important to precisely align the axis of the spindle which carries a drilling bit into the projected location of the center of the hole to be bored, so as to ensure accuracy of the bore location. To achieve this purpose, it has become conventional to first find an edge of an work piece, then find the second edge of a workpiece and by marking the intersection of the two lines to place the axis of the spindle directly above the found intersection. Various tools conventionally known as wigglers, are manufactured and sold to machinists to perform this task. However, the wigglers are not accurate to a sufficient degree to allow alignment with an accuracy of 0.001 of an inch. Besides, the conventional wigglers are often inaccurate, when locating a center of round stock and can prove cumbersome to use, when locating the edge, and thereby the center of the bore to be drilled in a workpiece.

The present invention contemplates provision of an edge finder device which will allow precise and accurate positioning of the spindle above a workpiece secured on a working table directly under the spindle.

SUMMARY OF THE INVENTION

It is therefore an object of the present invention to provide an edge finder for use with conventional milling machines.

It is another object of the present invention to provide an edge finder which is easy to use and can be mounted directly in a spindle of a milling machine.

It is a further object of the present invention to provide an edge finder for precise accurate locating of a bore center to be drilled by a milling machine.

These and other objects of the present invention are achieved through a provision of a edge finder which has an elongated main body having a first portion and a second portion. The first portion is adapted for engagement with a spindle of a milling machine, while the second portion is provided with a transverse opening extending therethrough which receives a contact pin in slidable engagement therein. The length of the pin is greater than the length of the opening, such that the pin extends outwardly, when the device is not in use, from opposite surfaces of the second portion. A measuring gauge is mounted on the main body, the measuring gauge being provided with a pivotal arm which extends outwardly and contacts one end of the slidable pin. The measuring gauge has a housing which carries a dial calibrated to show increments of up to 0.001 of an inch of movement of the spindle in relationship to a workpiece secured on a work table. The second portion of the main body has a flat polished contact surface through which the second end of the slidable pin extends. Once the contact surface of the second portion comes into contact with an edge of the workpiece, the slidable pin is pushed towards the pivotal arm, forcing the pivotal arm to move and operate the gauge to show the position of the edge of the workpiece in relationship to a true axis of the spindle and, therefore, of the drilling bit, which will be substituted for the edge finder during a bore drilling operation.

BRIEF DESCRIPTION OF THE DRAWINGS

Reference will now be made to the drawings, wherein like parts are designated by like numerals, and wherein FIG. 1 is a perspective plan view of the device in accordance with the present invention, with the collett of the spindle shown in phantom lines.

FIG. 2 is a cross-sectional view taken along lines 2—2 of FIG. 1.

FIG. 3 is a cross-sectional view taken along lines 3—3 of FIG. 1.

FIG. 4 is a perspective, plan view of a secured embodiment of the device in accordance with the present invention, with the collet of the spindle shown in phantom lines.

FIG. 5 is a cross-sectional view taken along lines 5—5 of FIG. 4; and

FIG. 6 is a cross-sectional view taken along lines 6—6 of FIG. 4.

DETAIL DESCRIPTION OF THE PREFERRED EMBODIMENT

Referring now the drawings in more detail, the device in accordance with the present invention, is generally designated by numeral 10. The device 10 comprises a means for securing the device 10 to a spindle of a milling machine. These means comprise a main body 12 having a first portion 14, and a reduced diameter second portion 16, which is integrally formed with a first portion 14. The first portion is generally circular in cross section as is better seen in FIG. 2, while the second portion 16 is semi-circular in cross section, having a convex surface 18 and a flat polished surface 20. The distance between a most distant point on convex surface 18 and center of flat surface 20 generally equals the radius of the cross section of the first portion 14. The surface 20 is designed to come into a close tolerance contact with a surface of a workpiece 22, as will be described in more detail hereinafter.

An upper end 24 of the first portion 14 is adapted to be engaged by a collet 26 of a spindle and secured thereto by conventional means. The lower end of the first portion 14 is provided with a transverse bore 28 which is sized and shaped to receive one member of a mounting assembly 30.

The lowermost part of the second portion 16 is provided with a transverse opening 32 which extends from the convex surface 18 to the flat surface 20 of the second portion 16. The opening 32 is slightly greater than a diameter of a slidable pin 34, which is adapted for free slidable movement within the opening 32, when the flat surface 20 comes into contact with a surface workpiece 22. The length of the pin 34 is greater than the radius, or the thickness of the second portion 16, so that one end 36 of the pin 34 extends outwardly from the flat surface 20, while the second end 38 extends outwardly from the convex surface 18. The second end 38 is provided with a transverse stop bar 40 which prevents the pin 34 from sliding completely out of the opening 32 during operation. Therefore, when the bar 40 comes into contact with the surface 18, further progressive movement of the pin 34 within the opening 32 is arrested. It will be appreciated, that movement of the pin 34 in the opposite direction is not prevented by the stop bar 40. Turning now to the mounting assembly 30, it can be seen to comprise a first member 42 which is fixedly secured, such as by threadable engagement of threads 44 with corresponding threads of the main body 12 at an approximate level of intersection between the first portion 14 and the second portion 16 of the body 12. The first member 42 extends transversely to a longitudinal axis of the main body 12 in the embodiment shown in FIG. 1.

A free end 46 of the first member 42 is provided with a through opening 48 which receives in tight frictional engagement therein a second member 50 of the mounting assembly 30. The member 50 is a traverse rod which extends through the opening 48 and is secured therein by securing means, for example threaded pin 52 which extends through an axial bore formed within the first member 42 until it intersects with the opening 48. The threaded pin 52 pushes against the rod 50, causing it to remain fixed in relationship to the first member 42.

A lower end of the rod 50 carries a measuring gauge 60 thereon, which is provided with a dial 62 and a spring loaded pivotal level 64. The gauge 60 is a sensitive gage with increments on the dial 62 (not shown) being made in 0.001 of an inch to allow precise and accurate measurement.

The pivotal lever 64 is set by a set screw 66 and extends outwardly from the gauge 60, contacting the stop bar 40 with its lowermost end 68 provided with a contact ball 70 which is fixedly secured to the end 68.

It will be noted, that the gauge 60 is secured in a fixed relationship to the rod 50 by clamps, screws or any other conventional means assuring a predetermined set position of the gauge 60 in relationship to the main body 12.

The gauge 60 is set in such a manner, that when the ball 70 contacts the stop bar 40 in a position schematically illustrated in FIG. 1, the dial 62 is set on a "0". In such position, the portion 36 of the pin 34 extends slightly outwardly from the flat surface 20, while the portion 38 extends outwardly to a certain degree from the convex surface 18. Any movement of the lever 64 being pushed by the pin 34 will cause the dial hand on the dial 62 to move, incrementally, and allow reading of the distance indication on the dial 62.

In operation, the end 24 of the first portion 14 is secured within collet 26 of a spindle (not shown) of a conventional milling machine. In this manner, the flat surface 20 will appear in co-alignment with a true axis of a spindle and, therefore, of a drilling bit which is temporarily removed from the spindle and substituted by the tool 10. The workpiece 22 is secured on a table and the spindle of the milling machine is manipulated through the use of provided handles until the pin 34 contacts a surface 72 of the workpiece 22. Further progressive movement of the tool 10 will force the pin 34 to move away from the surface 72, pushing the end 38 outwardly from the convex surface 18 and push the lever 64. This pushing action is transmitted to the dial indicator, and the handle on the indicator dial moves to a certain increment. This position is then noted and the dial is again set on a "0". In a similar operation, the second reference edge is found on the workpiece 22, and the intersection of the two found lines is marked by setting the spindle center exactly above the intersection, thereby orienting the center of the drill bit, which will be substituted for the tool 10 during a drilling operation, above the point designating the center of the future bore.

Turning now to the second embodiment of the present invention illustrated in FIGS. 4-6, the tool of the second embodiment is generally designated by numeral 100 and is seen to comprise a main body 102 having a first portion 104 and a second portion 106. The second portion 106, similarly to the portion 16 of the tool 10, is provided with an outer convex surface 108 and a contact flat surface 110. A transverse opening 122 is drilled through the lowermost part of the portion 106, the opening 122 being sized and shaped to slidably receive a pin 124 therein. The pin 124, similarly to the pin 34 of the device 10 extends slightly at one of its ends 126 from the surface 110, while extending outwardly from the convex surface 108 at its second end 128. A stop bar 130 is secured transversely to the end 128 to prevent release of the pin 124 from its engagement within the opening 122.

An angular bore 132 is formed in the portion 106 adjacent its intersection with portion 104, the opening 132 receiving in a threadable engagement therein a mounting assembly 140 which has a first member 142, and a second member 144 engaged with the first portion 142 at a right angle. The angle of the opening 132 and, therefore, the orientation of the mounting member 142 can be anywhere from 15 to 25 degrees, preferably 20 degrees, depending on the desired orientation of the measuring gauge 146 which is carried by one end of the transverse rod 144.

Similarly to the engagement of the rod 50, the rod 144 is fixedly secured within the transverse opening 148 formed in the free end of the first member 142 through the use of a threaded screw 150.

The gauge 146, similarly to the gauge 60 is a precision gauge with a springloaded pivotal arm 152. Movement of the arm 152 causes a dial hand (not shown) of the dial 154 to move to the indicated increment and allow reading of the distance by the machinist.

The pivotal arm 152 is set by a set screw 156 and is attached to the gauge 146 in a conventional manner. A free end 158 of the pivotal arm 152 is provided with a contact ball 160 which contacts the cross bar 130 of the pin 124.

The upper end 162 of the first portion 104 of the main body 102 is adapted for securing with the collet of a conventional spindle.

During operation, the secured tool 100 is moved through manipulation of the spindle and the collet 164, causing the main body 102 to approach a secured workpiece 166. The flat surface 110 of the portion 106 comes into direct contact with a surface 168 of the workpiece 166. The contact between the surfaces 166 and 110 causes the end 126 of the pin 124 to move away from the surface 166 and push on the pivotal arm 152, causing the hand dial on the indicator 154 to move the distance by which the pin 124 was depressed. In this manner the axis of the spindle end of the drill bit which will be positioned in the spindle is aligned with the edge 168 of the workpiece 166.

The edge finder tools 10 and 100 of the present invention are capable of detecting distances of 0.001 of an inch, and are easy to operate. They do not require any further tools for finding an edge and thereby designating a location, where a bore needs to be drilled.

Many changes and modifications can be made within the design of the present invention without departing from the spirit thereof. I, therefore, pray that my rights to the present invention be limited only by the scope of the appended claims.

I claim:

1. A device for finding an edge of a workpiece, comprising:
   a main body having a first portion and a second portion integrally connected to the first portion, said second portion having a contact surface co-aligned with a true axis of a drilling tool;
   a measuring gauge secured on the main body, said measuring gauge being provided with a spring-operated pivotal arm extending outwardly from a measuring gauge housing; and
   a slidable pin positioned within a transverse opening formed in the second portion, said pin having opposite ends which extend outwardly from the opening, one end of the pin contacting the pivotal arm and forcing it to move, when a pushing force is applied to the opposite end of the pin, while the contact surface of the second portion contacts edge of the workpiece.

2. The device of claim 1, wherein said pin is provided with means for preventing disengagement of the pin from the opening.

3. The device of claim 2, wherein said means for preventing disengagement comprise a stop bar secured transversely to a longitudinal axis of the pin and having a length greater than a diameter of the transverse opening.

4. The device of claim 1, further comprising a mounting assembly for securing the measuring gauge to the main body.

5. The device of claim 4, wherein said mounting assembly comprises a first elongated member fixedly attached to the main body and a second elongated member which is fixedly secured to the first member in transverse relationship thereto, and wherein said measuring gauge is secured to a free end of the second elongated member.

6. The device of claim 5, wherein said first elongated member is perpendicularly attached to the main body.

7. The device of claim 5, wherein said first elongated member is attached at an angle to a longitudinal axis of the main body.

8. The device of claim 7, wherein said angle of attachment is between 15 and 25 degrees.

9. The device of claim 7, wherein said angle of attachment is 20 degrees.

10. The device of claim 1, wherein said main body has a longitudinal axis, and wherein said contact surface extends in co-alignment with a longitudinal axis.

11. The device of claim 10, wherein a free end of a first portion is adapted for securing to a spindle of a milling machine in such a manner, that the longitudinal axis of the main body is substantially co-aligned with a true axis of the spindle.

12. The device of claim 5, wherein a transverse bore is formed in the first elongated member, the bore being sized and shaped to frictionally engage the second elongated member therein.

13. The device of claim 12, wherein an axial bore extends from one end of the first elongated member to an intersection with the transverse bore, and wherein a securing rod extends through said axial bore to contact the second elongated member and facilitate a secure positioning of the second elongated member within a traverse bore.

14. The device of claim 5, wherein said first elongated member is secured to the main body adjacent an area of connection between the first portion and the second portion.

15. A device for finding the edge of a workpiece, comprising:
   a main body having a first portion and a second portion which is integrally connected to the first portion, said main body having a longitudinal axis, and said second portion having a contact surface, said contact surface being co-aligned with a longitudinal axis of the main body;
   a measuring gauge secured on the main body, said measuring gauge being provided with a spring-operated pivotal arm extending outwardly from a measuring gauge housing;
   a mounting assembly for securing the measuring gauge to the main body, said mounting assembly comprising a first elongated member fixedly attached to the main body, and a second elongated member which is fixedly attached to the first member, said first elongated member being provided with a transverse bore which is sized and shaped to frictionally engage a second elongated member therein, and wherein said measuring gauge is secured to a free end of the second elongated member, said first elongated member being secured to the main body adjacent an area of connection between the first portion and the second portion; and
   a slidable pin positioned within a transverse opening formed in the second portion of the main body, said pin having opposite ends which extend outwardly from the opening, one end of the pin contacting a pivotal arm of the measuring gauge and forcing it to move, when a pushing force is applied to the opposite end of the pin and while the contact surface of the second portion contacts an edge of the workpiece.

16. The device of claim 1, wherein said pin is provided with means for preventing disengagement of the pin from the opening, said means comprising a stop bar fixedly attached to one end of the pin transversely to a longitudinal axis of the pin and having a length greater than a diameter of the transverse opening.

17. The device of claim 15, wherein said first elongated member is perpendicularly attached to the main body.

18. The device of claim 15, wherein said first elongated member is attached at an angle to a longitudinal axis of the main body.

19. A device for finding an edge of a workpiece, comprising:
   a main body having a first portion and a second portion which is integrally connected to the first portion, said first portion being adapted for engaging with a spindle of a milling machine, said main body having a longitudinal axis, said second portion being provided with a contact surface which extends in co-alignment with the longitudinal axis of the main body, said second portion being provided with a transverse opening extending therethrough, said opening receiving a slidable pin therein;
   a measuring gauge secured to the main body adjacent an area of intersection between the first portion and the second portion, said measuring gauge being provided with a spring-operated pivotal arm which extends outwardly from a measuring gauge housing and contacts the slidable pin, said pin forcing the pivotal arm to move when a pushing force is applied to one end of the pin, while the contact surface of the second portion contacts an edge of the workpiece, said slidable pin being provided with a transverse bar mounted at an opposite end of the slidable pin which contacts the pivotal arm, said transverse bar having a length greater than a diameter of the transverse opening, in which the pin is slidably engaged;

means for mounting the measuring gauge to the main body, said mounting means comprising a first elongated member fixedly attached to the main body and a second elongated member which is fixedly secured to the first member in transverse relationship thereto, said first member being provided with an axial bore which extends from a free end of the first elongated member inwardly to contact the second elongated member and to facilitate secure position of the second member in relation to the first elongated member.

20. The device of claim 18, wherein said first elongated member is attached at a right angle to the main body.

21. The device of claim 19, wherein said first elongated member is attached at an angle to a longitudinal axis of the main body.

* * * * *